(12) United States Patent
Mohr

(10) Patent No.: US 8,166,779 B2
(45) Date of Patent: May 1, 2012

(54) BAFFLE SYSTEM FOR BLANK MOLDS OF A GLASSWARE FORMING MACHINE

(75) Inventor: Paul B. Mohr, Waterville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 1218 days.

(21) Appl. No.: 11/581,139

(22) Filed: Oct. 13, 2006

(65) Prior Publication Data
US 2008/0184742 A1    Aug. 7, 2008

(51) Int. Cl.
*C03B 9/14* (2006.01)
*C03B 9/353* (2006.01)

(52) U.S. Cl. .......................... 65/261; 65/264

(58) Field of Classification Search ............ 65/261, 65/307
See application file for complete search history.

(56) References Cited

U.S. PATENT DOCUMENTS

| | | | |
|---|---|---|---|
| 2,290,798 A | 7/1942 | Berthold |
| 2,619,774 A | 12/1952 | Rowe |
| 3,189,427 A | 6/1965 | Schirm |
| 3,403,016 A | 9/1968 | Smith |
| 3,472,642 A | 10/1969 | Irwin |
| 3,561,941 A | 2/1971 | Dahms |
| 3,586,494 A | 6/1971 | Mumford |
| 4,009,019 A | 2/1977 | Foster |
| 4,261,724 A | 4/1981 | Sarkozy |
| 4,466,821 A | 8/1984 | Irwin et al. |
| 4,610,713 A | 9/1986 | Clegg |
| 5,928,400 A | 7/1999 | Meyer et al. |
| 2003/0167799 A1 | 9/2003 | Tijerina-Ramos et al. |
| 2005/0235697 A1 | 10/2005 | Tijerina-Ramos et al. |

OTHER PUBLICATIONS

M. E. DEY&CO. "Bearings, Bushings, and Special Duties", http://www.medey.com/pdf/Bearings%20and%20%20Bushings%20-%20Definitions%20and%20Special%20Duties%20.pdf, Mar. 18, 2006.*

* cited by examiner

*Primary Examiner* — Matthew Daniels
*Assistant Examiner* — Cynthia Szewczyk

(57) ABSTRACT

A baffle system for blank molds of a glassware forming machine, in accordance with an exemplary embodiment of the present disclosure, includes a first shaft mounted for movement in the direction of its axis and for rotation around its axis. A baffle arm is mounted to the first shaft and a manifold is suspended from the baffle arm. A plurality of baffle holders are suspended from the manifold, and rocker arms interconnect the baffle holders for equalizing forces applied by the baffle holders to the blank molds of a glassware forming machine. A second shaft is adjacent to the first shaft and a link arm extends between the second shaft and the manifold. The baffle arm, the manifold and the link arm form a linkage that moves the baffle holders between a first position overlying the blank molds and a second position spaced from the blank molds. Disposition of the rocker arms between the manifold and the baffle holders permits the manifold to be folded under the baffle arm in the second position of the baffle arm, the manifold and the baffle holders. The link arm preferably is coupled to the second shaft for longitudinal and pivotal movement on the second shaft, and a wear block preferably is carried by the baffle arm and engages the link arm adjacent to the second shaft for supporting the link arm during movement of the link arm on the second shaft.

14 Claims, 5 Drawing Sheets

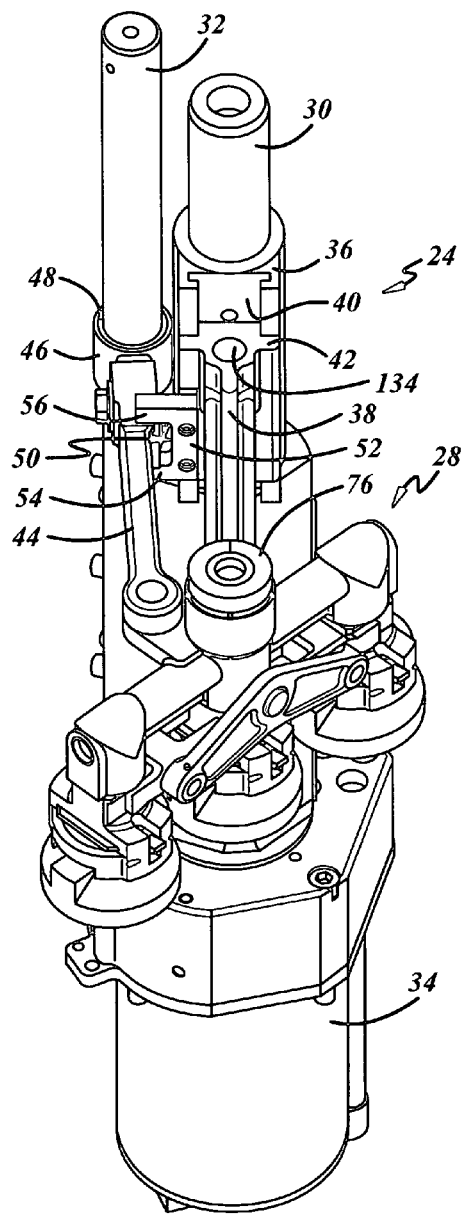

BAFFLE SYSTEM FOR BLANK MOLDS OF A GLASSWARE FORMING MACHINE

The present disclosure relates to the baffles in a blow-and-blow glassware forming machine, and more particularly to linkages for equalizing forces between or among the baffle holders in the event that the upper faces of the blank molds are uneven.

BACKGROUND AND SUMMARY OF THE DISCLOSURE

In blow-and-blow glassware forming systems, a molten glass gob is fed into the upper end of a blank mold. A baffle is then placed over the upper end of the blank mold and settle air is fed through the baffle to push the glass gob against the lower end of the blank mold. Blow air is then fed through the lower end of the blank mold to form the glass gob against the confines of the blank mold, including the baffle, and thereby to form the blank or parison that subsequently is placed in a blow mold for blowing the final article, such as a hollow glass container. U.S. Pat. No. 3,586,494 discloses a baffle arm and baffle holder mounting arrangement. U.S. Pat. No. 4,466,821 discloses a baffle holder mounting arrangement that includes means for balancing the forces applied through the baffles to the blank molds in the event that the blank molds are uneven.

The present disclosure embodies a number of aspects that can be implemented separately from or in combination with each other.

A baffle system for blank molds of a glassware forming machine, in accordance with an exemplary embodiment of the present disclosure, includes a first shaft mounted for movement in the direction of its axis and for rotation around its axis. A baffle arm is mounted to the first shaft and a manifold is suspended from the baffle arm. A plurality of baffle holders are suspended from the manifold, and rocker arms interconnect the baffle holders for equalizing forces applied by the baffle holders to the blank molds of a glassware forming machine. A second shaft is adjacent to the first shaft and a link arm extends between the second shaft and the manifold. The baffle arm, the manifold and the link arm form a linkage that moves the baffle holders between a first position overlying the blank molds and a second position spaced from the blank molds. Disposition of the rocker arms between the manifold and the baffle holders permits the manifold to be folded under the baffle arm in the second position of the baffle arm, the manifold and the baffle holders. The link arm preferably is coupled to the second shaft for longitudinal and pivotal movement on the second shaft, and a wear block preferably is carried by the baffle arm and engages the link arm adjacent to the second shaft for supporting the link arm during movement of the link arm on the second shaft.

BRIEF DESCRIPTION OF THE DRAWINGS

The disclosure, together with additional features, advantages and aspects thereof, will best be understood from the following description, the appended claims and the accompanying drawings, in which:

FIG. 2 is a perspective view of the baffle system in the machine of FIG. 1;

FIG. 3 is a perspective view of the baffle arm assembly in the baffle system of FIG. 2;

DETAILED DESCRIPTION OF PREFERRED EMBODIMENTS

Figure 1:
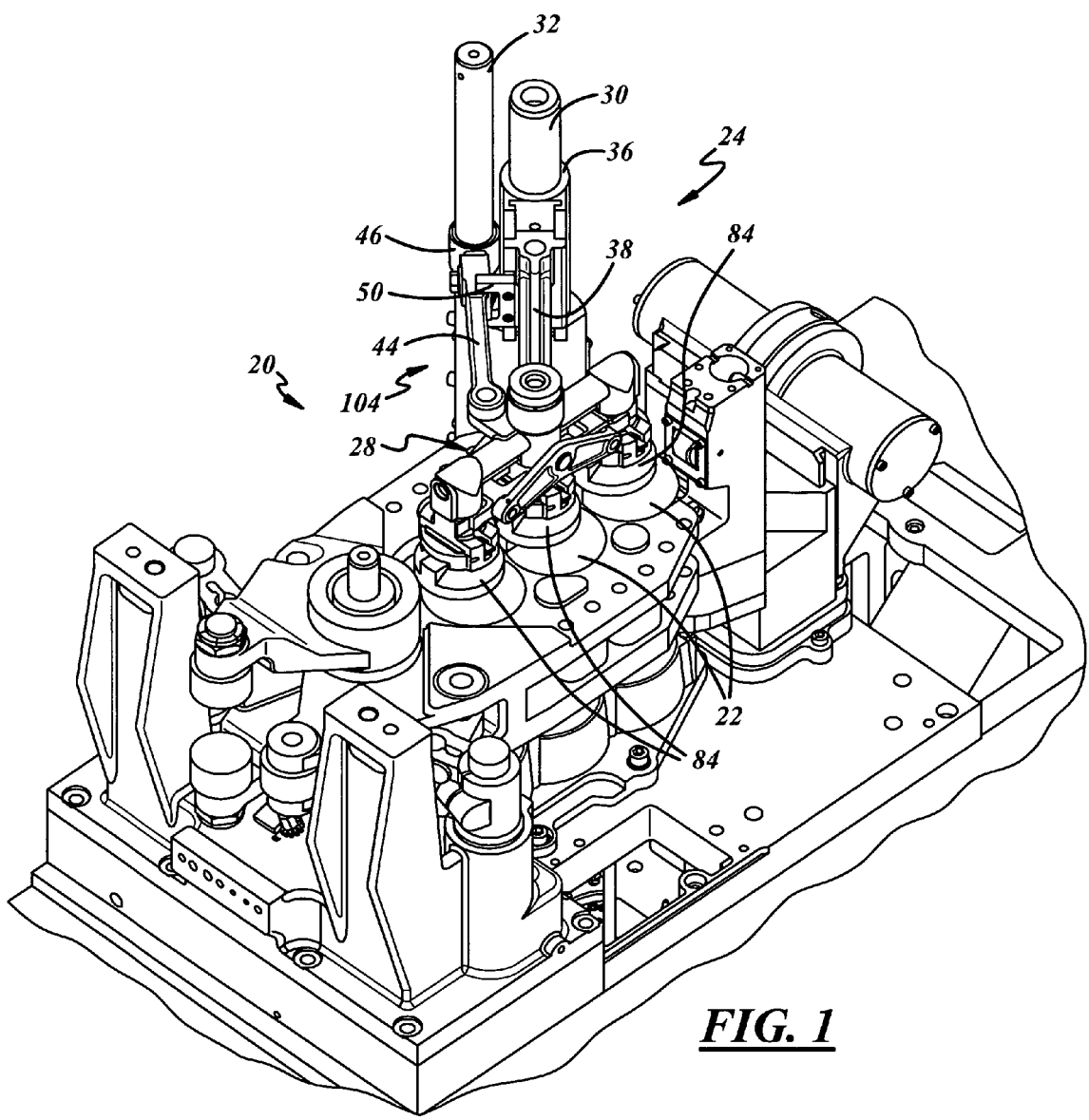
FIG. 1 is a fragmentary perspective view of the blank mold portion of a glassware forming machine and illustrates a baffle system in accordance with an exemplary embodiment of the present disclosure.
Figure 4:
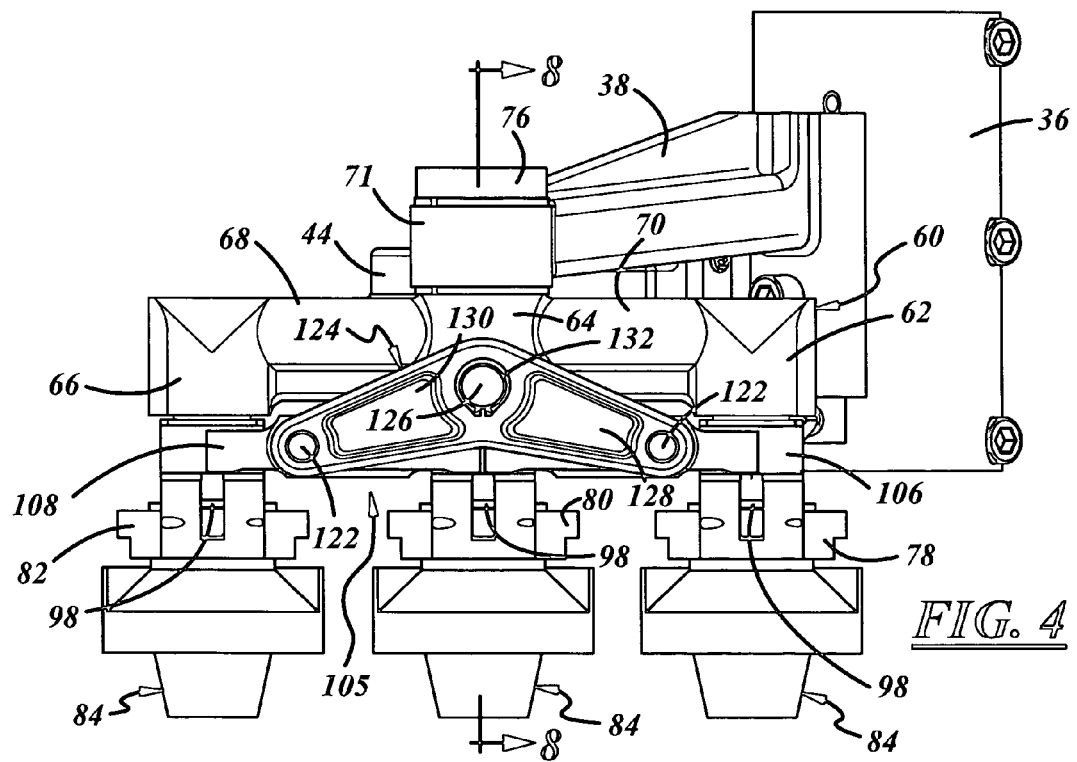
FIG. 4 is a side elevational view of the baffle arm assembly of FIG. 3.

FIG. 1 illustrates a portion of a glassware forming machine 20, which preferably although not necessarily is an individual section blow-and-blow glassware forming machine. A plurality of blank molds 22 receive molten glass gobs, and a baffle assembly 24 is mounted adjacent to each section of machine 20 for placing baffles over the open ends of blank molds 20 and directing settle air into the blank molds. U.S. Pat. No. 4,362,544 includes a background discussion of the blow-and-blow process.

Referring now to FIGS. 1-4, baffle assembly 24 includes a baffle arm assembly 28 mounted on a pair of shafts 30,32 positioned adjacent to each section of machine 20. (Machine 20 may have only one section, but preferably has a plurality of individual sections.) The first shaft 30 has a longitudinal axis, and is mounted for movement in the direction of its axis and for rotation around its axis driven, for example, by an electrical actuator 34 (FIG. 2) or by a pneumatic actuator or a mechanically driven cam system. The second shaft 32 preferably is stationary. A collar 36 is secured to shaft 34, and a baffle arm 38 extends from collar 36. In the exemplary embodiment of the disclosure, collar 36 has a T-shaped slot 40 and baffle arm 38 has a T-shaped head 42 that is received in slot 40. In this way, baffle arm 38 is adjustably positionable with respect to collar 36 to accommodate differing sizes of blank molds 22 (FIG. 1). However, for a given size of blank molds 22, baffle arm 38 is rigidly secured to collar 36. A link arm 44 extends from a collar 46 that is slidably and rotatably mounted on shaft 32, such as by means of a high-temperature bearing 48. A wear block 50 couples baffle arm 38 to link arm 44. Wear block 50 preferably is C-shaped, having a base 52 mounted on head 42 of baffle arm 38 such as by suitable screws, a first arm 54 that engages an underside of link arm 44 and a second arm 56 that engages the upper side of link arm 44. The edge of wear block 50 remote from base 52 preferably is open to permit separation of link arm 44 with respect to baffle arm 38 for maintenance or repair, for example.

Figure 5:
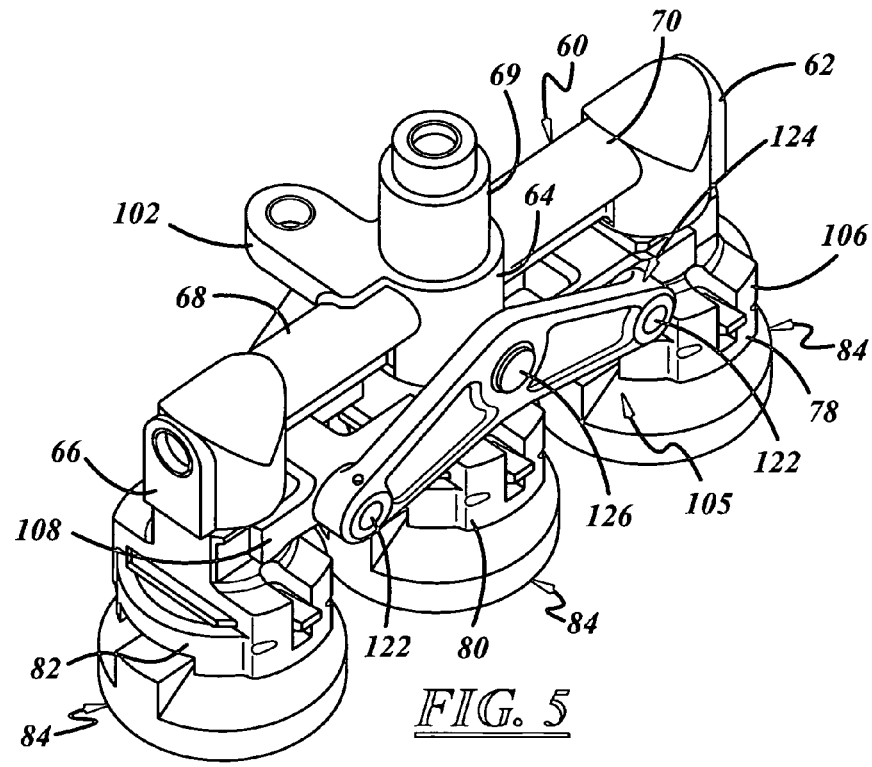
FIG. 5 is a perspective view of the baffle holder manifold subassembly in the baffle arm assembly of FIGS. 3 and 4.
Figure 7:
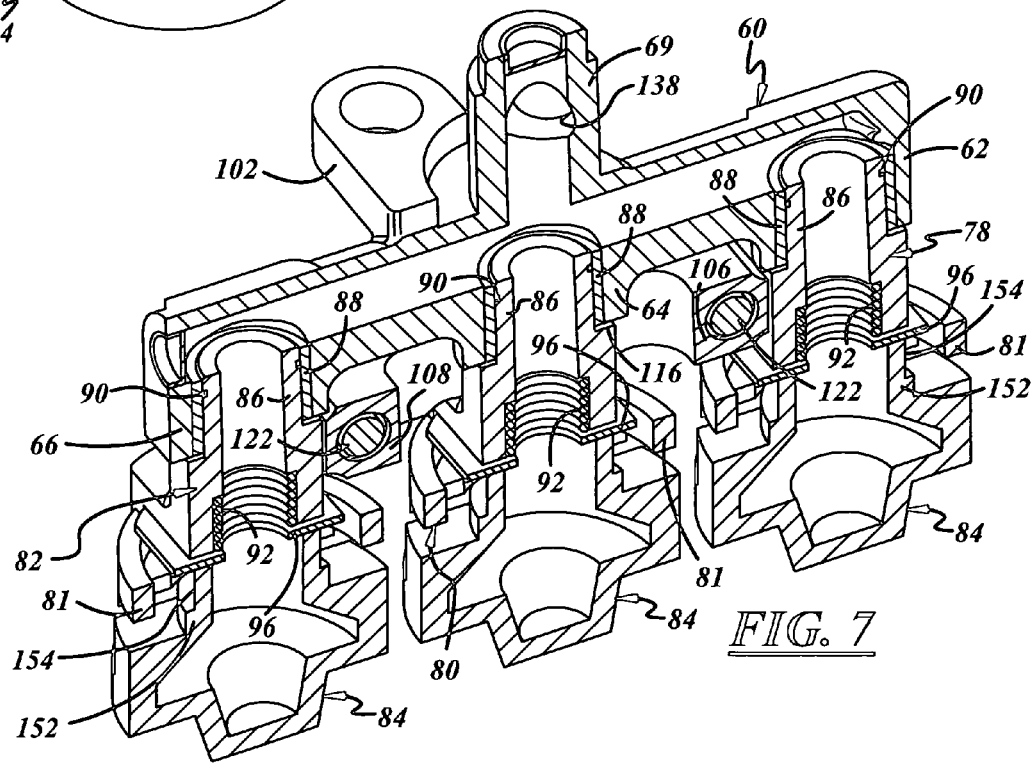
FIG. 7 is a sectional view of the subassembly of FIG. 5.

A baffle holder manifold subassembly 58 is suspended from the ends of baffle arm 38 and link arm 44 remote from collars 36, 46. Baffle holder manifold subassembly 58 includes a baffle holder manifold 60 (FIGS. 5 and 7) in the form of a plurality of parallel fittings 62, 64, 66 interconnected by tubular sections 68, 70. (A three-baffle assembly is illustrated by way of example in the drawings for a so-called triple gob machine. The disclosure applies equally as well to other types of machines having a plurality of blank molds at each machine section, including double-gob machines, four-gob or quad machines, etc.) Center fitting 64 has an extension 69 that is connected to the end of baffle arm 38. In the illustrated embodiment (FIG. 8), extension 69 is mounted by means of a split bearing 72, 74 within a collar 71 on the end of baffle arm 38. Fittings 62, 64, 66, tubular sections 68, 70 and extension 69 preferably are of one-piece integrally formed hollow construction, as best seen in FIG. 7. A nut 76 is secured to extension 69 to suspend the manifold from the baffle arm.

Baffle holders 78,80,82 are removably mounted within respective fittings 62,64,66. The mounting arrangement for baffle holder 80 will be described in detail, the mounting arrangements for the other baffle holders being substantially identical to that of baffle holder 80. Baffle holder 80 has an enlarged head portion 82 for mounting a baffle 84 and a shank portion 86 that extends into fitting 64. A baffle 84 is removably mounted in each baffle holder 78, 80, 82. A sleeve 88 is disposed between shank 86 and fitting 64. An O-ring 90 or other suitable resilient seal is received in an exterior groove on shank portion 86 and retains baffle holder 80 within fitting 64 by frictional engagement with sleeve 88. A coil spring 92 is captured in compression between an internal shoulder 94 on shank 86 and a wear plate 96 loosely captured within head 82 of holder 80. A locking lever 98 is pivotally mounted by a pin 100 to head 82 of baffle holder 80 for selectively locking baffle 84 in position against wear plate 96 or permitting removal of baffle 84 for maintenance or repair.

Figure 9:
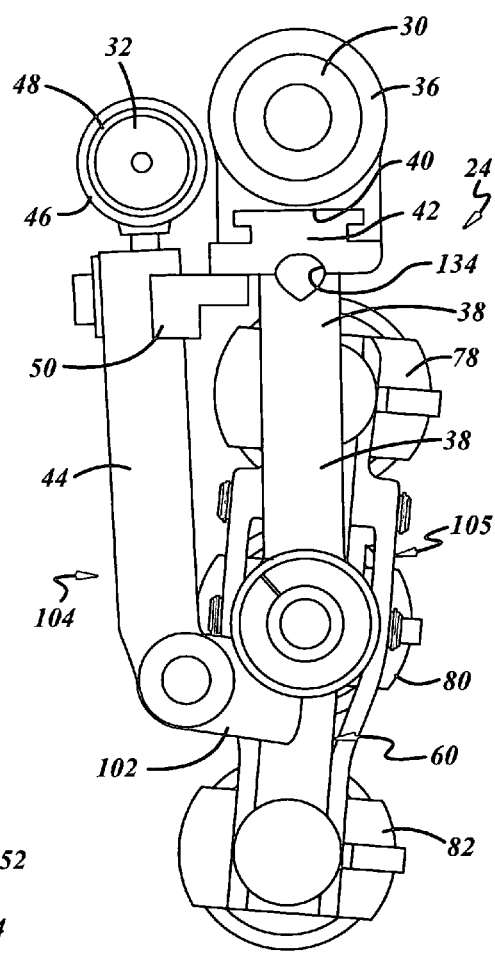
FIG. 9 is a top plan view of the baffle assembly of FIG. 2 with the baffles in a fully retracted position.

An arm 102 extends from manifold 60 for pivotal connection to the end of link arm 44 remote from collar 46. Manifold 60, baffle arm 38 and link arm 44 thus cooperate with shafts 30, 32 (FIGS. 1 and 2) to form a four-bar linkage 104 for controlling motion of baffle holder manifold subassembly 58 between an extended position (FIGS. 1-3) in which baffle holders 78, 80, 82 overlie blank molds 22, and a retracted position (FIG. 9) in which baffle holder manifold subassembly 58 is folded beneath baffle arm 38. This pivotal motion of four-bar linkage 104 and baffle holder manifold subassembly 58 is controlled by rotation of shaft 30. Vertical motion of baffle holder manifold subassembly 58 likewise is controlled by axial motion of shaft 30. Wear block 50, which slidably couples baffle arm 38 to link arm 44, helps balance the forces applied to link arm 44 and collar 46, particularly during upward and downward motion of the baffle arm assembly.

Figure 6:
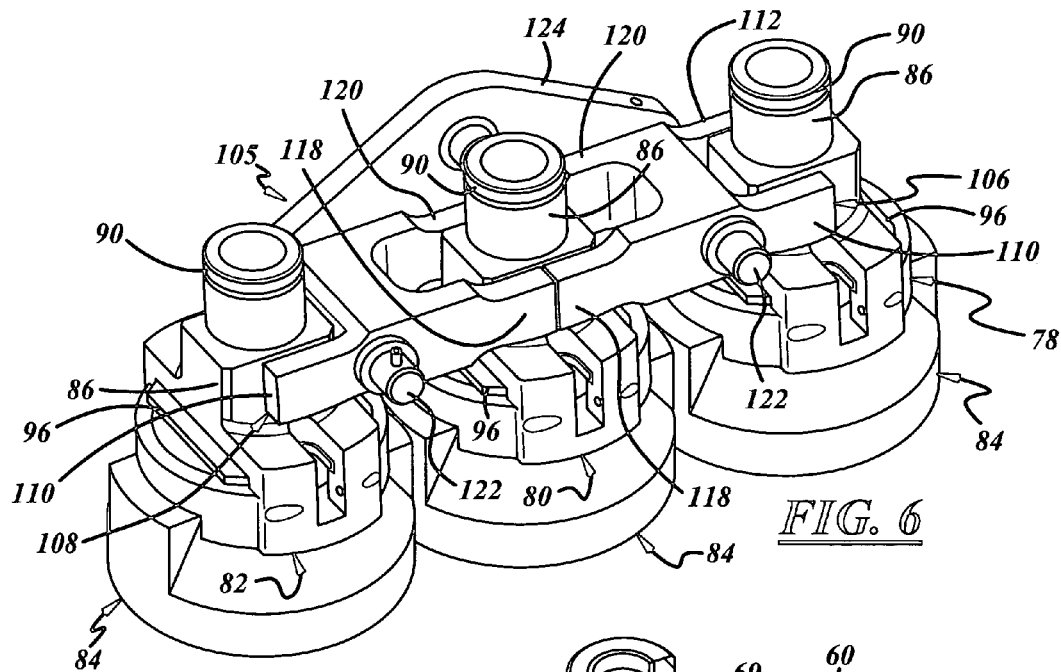
FIG. 6 is a fragmentary perspective view of a portion of the manifold subassembly of FIG. 5.

Baffle holders 78,80,82 are suspended from manifold 60, and a system 105 of rocker arms interconnect baffle holders 78, 80, 82 for equalizing the forces applied by the baffle holders to the blank molds 22 of machine 20. This system 105 of rocker arms preferably includes a first H-shaped arm 106 between baffle holders 78 and 80, a second H-shaped arm 108 between baffle holders 80 and 82, and front and back bell cranks 124 that interconnect arms 106, 108. Arm 106 has a pair of legs 110, 112 disposed on opposed sides of holder shank 86 and slidably captured between holder 78 and fitting 62 on manifold 60. A second pair of arms 118, 120 embrace shank 86 of holder 80 and are slidably captured between the holder and fitting 64 on manifold 60. H-shaped arm 108 likewise has arms 110, 112 that slidably embrace shank 86 of holder 82 between the head of the holder and fitting 64, and a second pair of arms 118, 120 that slidably embrace shank 86 of holder 80 between fitting 66 and the head of holder 80. Each H-shaped arm 106, 108 has an associated pivot pin 122 that extends forwardly and rearwardly from the arm at about the mid position of the arm. A bell crank 124 is positioned on both the front and back sides of baffle holder 80. (The front bell crank and the manifold are removed in FIG. 6 for purposes of illustration.) Each bell crank 124 has a center that is pivotally mounted on a pivot pin 126 on baffle holder 80, and laterally extending arms 128, 130 that embrace pivot pins 122 on arms 106, 108. Pivot pins 126 are mounted on center fitting 64 of manifold 60, and bell cranks 124 are secured to pivot pins 126 by lock rings 132 (FIG. 4) for example. This combination of H-shaped arms 106, 108 and bell cranks 124 forms rocker arm system 105 that interconnects the baffle holders and equalizes forces applied by the baffle holders to the blank molds of the glassware forming machine.

Each baffle 84 has a shank 152 that is removably received within head portion 81 of the associated baffle holder 78, 80, 82. Each baffle shank 152 has an external channel or recess 154, best seen in FIG. 7. In the locking position of each locking lever 98 illustrated in the drawings, the body of lever 98 is received in recess 154 to hold the baffle in position. If locking lever 98 is pivoted to the unlocking position (a little over 90° clockwise in FIG. 8), the locking lever clears recess 154 and the baffle can be pulled from within the baffle holder.

Figure 8:
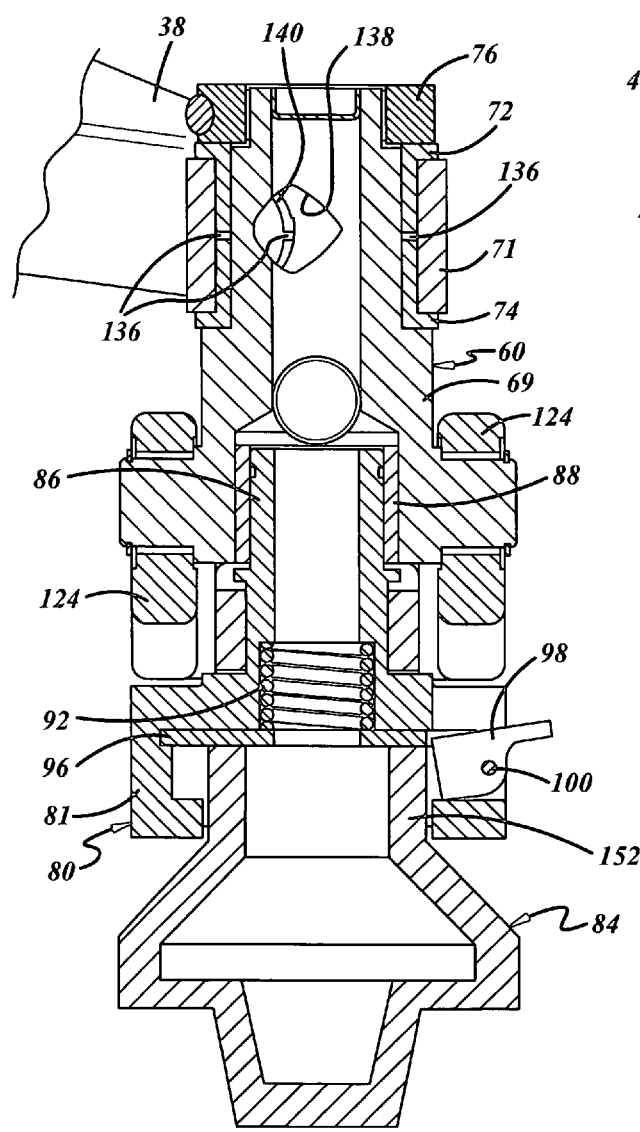
FIG. 8 is a sectional view taken substantially along the line 8-8 in FIG. 4.

Air is supplied to baffle holders 78, 80, 82 though an air inlet 134 on baffle arm 38 (FIGS. 2 and 3), through the hollow interior of baffle arm 38 into the hollow interior of manifold 60, through manifold 60 including the hollow interiors of fittings 62, 64, 66, and through the hollow interiors of baffle holders 78, 80, 82. Referring in particular to FIG. 8, split bearing 72, 74 has an upper section 72 and a lower section 74 that are separated from each other by a slot 136 that extends around extension 69. Extension 69 has a laterally opening air inlet 138 (FIGS. 7 and 8) that aligns with an enlarged opening 140 between bearing sections 72, 74, as shown in FIG. 8, when baffle holder manifold subassembly 58 is in the first or extended position of FIGS. 1-3 overlying blank molds 22. As the baffle assembly is retracted from this first position toward the second position illustrated in FIG. 9, openings 138, 140 (FIG. 8) move out of registry with each other. However, slot 136 between bearing sections 72, 74 continues to feed a smaller amount of air into extension 69 and each of the baffle holders. This smaller amount of air cools baffles 84 mounted in the baffle holders between operations of the baffles over the blank molds.

The baffle system of the present disclosure has been disclosed in connection with an exemplary embodiment, and a number of modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. A baffle system for blank molds of a glassware forming machine, which includes:
   a first shaft having an axis and being mounted for movement in the direction of said axis and for rotation around said axis,
   a baffle arm mounted to said first shaft,
   a manifold suspended from said baffle arm,
   a plurality of baffle holders suspended from said manifold,
   rocker arms interconnecting said baffle holders for equalizing forces applied by said baffle holders to blank molds of a glassware forming machine,
   a second shaft adjacent to said first shaft, and
   a link arm extending between said second shaft and said manifold,
   said baffle arm, said manifold and said link arm forming a linkage that moves said baffle holders between a first position overlying the blank molds and a second position spaced from the blank molds,
   disposition of said rocker arms between said manifold and said baffle holders permitting said manifold to be folded under said baffle arm in said second position of said baffle arm, said manifold and said baffle holders.

2. The baffle system set forth in claim 1 wherein said link arm is coupled to said second shaft for longitudinal and pivotal movement on said second shaft, and wherein a wear block is carried by said baffle arm and engages said link arm adjacent to said second shaft for supporting said link arm during movement of said link arm on said second shaft.

3. The baffle system set forth in claim 2 wherein said wear block has a first arm underlying said link arm and a second arm overlying said link arm.

4. The baffle system set forth in claim 1 including air passages extending through said baffle arm, said manifold and said baffle holders for applying air to baffles carried by said baffle holders.

5. The baffle system set forth in claim 4 wherein said air passage is continuously open during movement of said baffle arm, said manifold and said baffle holders between said first and second positions.

6. The baffle system set forth in claim 5 wherein said manifold is pivotally coupled to said baffle arm by a split bearing that has an enlarged opening that registers with said air passages in said baffle arm and said manifold in said first position of said baffle holder, and a slot that registers with said air passages in said baffle arm and said manifold in other than said first position of said baffle holder.

7. The baffle system set forth in claim 1 wherein each of said baffle holders includes a lever for locking a baffle in said baffle holder.

8. The baffle system set forth in claim 7 including a wear plate in each said baffle holder for contact with baffles in said baffle holders, said lever blocking removal of said wear plate from each said baffle holder.

9. The baffle system set forth in claim 7 wherein said lever is mounted on said baffle holder for pivotal movement into and out of a recess on a baffle received in said baffle holder.

10. The baffle system set forth in claim 1 including a collar coupled to said first shaft, said baffle arm being adjustably coupled to said collar for adjusting position of said baffle arm with respect to said first shaft for differing blank mold sizes.

11. The baffle system set forth in claim 10 wherein said collar has a T-slot extending parallel to said first shaft and said baffle arm has a T-shaped head disposed in said T-slot.

12. A baffle system for blank molds of a glassware forming machine, which includes:
    a first shaft having an axis and being mounted for movement in the direction of said axis and for rotation around said axis,
    a baffle arm mounted on said first shaft,
    a manifold suspended from said baffle arm,
    a plurality of baffle holders suspended from said manifold,
    rocker arms interconnecting said baffle holders for equalizing forces applied by said baffle holders to blank molds of a glassware forming machine, said rocker arms being disposed below a top of the manifold;
    a second shaft adjacent to said first shaft, and
    a link arm extending between said second shaft and said manifold,
    said baffle arm, said manifold and said link arm forming a linkage that moves said baffle holders between a first position overlying the blank molds and a second position spaced from the blank molds, wherein suspension of said manifold from said baffle arm and disposition of said rocker arms below a top of said manifold permits said manifold to be folded under said baffle arm in said second position of said baffle arm, said manifold and said baffle holders.

13. The baffle system set forth in claim 12 wherein said manifold is pivotally coupled to said baffle arm.

14. The baffle system set forth in claim 13 wherein said manifold is coupled to said baffle arm by a split bearing that has an enlarged opening that registers with said air passages in said baffle arm and said manifold in said first position of said baffle holder, and a slot that registers with said air passages in said baffle arm and said manifold in other than said first position of said baffle holder.

\* \* \* \* \*